(12) United States Patent
Jackson et al.

(10) Patent No.: US 10,504,028 B1
(45) Date of Patent: Dec. 10, 2019

(54) TECHNIQUES TO USE MACHINE LEARNING FOR RISK MANAGEMENT

(71) Applicant: Capital One Services, LLC, McLean, VA (US)

(72) Inventors: Yvette Jackson, Montpelier, VA (US); Jeffrey Capelli, Williamsburg, VA (US); Jennelle Spurlock, New Orleans, LA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/393,070

(22) Filed: Apr. 24, 2019

(51) Int. Cl.
*G06N 5/04* (2006.01)
*G06F 16/9532* (2019.01)
*G06N 20/00* (2019.01)

(52) U.S. Cl.
CPC ......... *G06N 5/048* (2013.01); *G06F 16/9532* (2019.01); *G06N 20/00* (2019.01)

(58) Field of Classification Search
CPC .... G06N 20/00; G06N 99/00; H04L 63/1416; G06F 16/2455; G06F 16/24539; G06F 16/24534; G06F 16/2453; G06Q 10/0634; G06Q 30/0201; G16H 10/60; G16H 50/30
See application file for complete search history.

(56) References Cited

U.S. PATENT DOCUMENTS

| | | | | |
|---|---|---|---|---|
| 9,600,779 | B2* | 3/2017 | Hoover | G06Q 30/06 |
| 9,779,236 | B2* | 10/2017 | Abrams | G06F 21/554 |
| 10,104,113 | B1* | 10/2018 | Stein | H04L 63/1433 |
| 2016/0180264 | A1* | 6/2016 | Beck | G06Q 10/0635 705/7.28 |
| 2019/0095588 | A1* | 3/2019 | Arffa | G16H 50/30 |

FOREIGN PATENT DOCUMENTS

CN   104850905 A    8/2015
WO   2016094330 A2  6/2016

* cited by examiner

*Primary Examiner* — Paulinho E Smith

(57) ABSTRACT

Various embodiments are generally directed to techniques to build and train a machine learning model with features of which at least one feature corresponds to risk indicia and at least one other feature corresponds to a data source. These features, in general, provide data (e.g., values) indicating a degree of relevance between a particular record and a risk assessment of that particular record's subject matter. User refinement in the form of user selections and other interactions with the particular record and other records provide insights into proper risk management.

20 Claims, 10 Drawing Sheets

700

PERFORM FEATURE EXTRACTION ON RECORDS ACROSS A PLURALITY OF DATASETS
702

BUILD A MACHINE LEARNING MODEL TO INCLUDE RISK ASSESSMENT DATA
704

IDENTIFY A SET OF RECORDS THAT EXCEED A BASELINE THRESHOLD
706

RETURN AT LEAST ONE RECORD IN RESPONSE TO SEARCH QUERY
708

MODIFY RISK ASSESSMENT DATA IN THE MACHINE LEARNING MODEL
710

*FIG. 7*

TECHNIQUES TO USE MACHINE LEARNING FOR RISK MANAGEMENT

BACKGROUND

Risk management refers to the identification, assessment, and prioritization of risks in business operations and products. This is followed by coordinated and economical application of resources to minimize, monitor, and control the probability and/or impact of unfortunate events or to maximize the realization of opportunities. There are two types of events: negative events can be classified as risks while positive events are classified as opportunities. Risks manifest in various forms and may be caused by uncertainty in related markets, threats from project failures, legal liabilities, credit risk, accidents, natural causes and disasters, deliberate attack from an adversary, or events of uncertain or unpredictable root-cause. Several risk management standards have been developed but fall short of a complete solution. Complying with these standards is time-consuming and even when compliance is made, the results were not meaningful.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to use machine learning for risk management. In some embodiments, the machine learning model relies upon user refinement (i.e., user selections and other interactions) to ensure accuracy assessing risk in a product or process. In one embodiment, for example, an apparatus may comprise a processing circuit and logic stored in computer memory and executed on the processing circuit. The logic may be operative to cause the processing circuit to perform feature extraction on records across a plurality of datasets. Features corresponding to the feature extraction include one or more features associated with risk indicia and one or more features associated with a particular data source of at least one of the plurality of datasets. The logic is operative to cause the processing circuit to build a machine learning model based upon data generated during the feature extraction on the records. The machine learning model includes risk assessment data for the records across the plurality of datasets. The logic is operative to cause the processing circuit to identify a set of records from the records across the plurality of datasets. Each record of the set of records has risk assessment data that exceeds a baseline threshold. The logic is operative to further cause the processing circuit to return at least one record of the set of records in response to search queries. The logic is operative to further cause the processing circuit to modify the risk assessment data in the machine learning model in response to user selections corresponding to the at least one returned record. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the system of FIG. 1.

DETAILED DESCRIPTION

Figure 1:
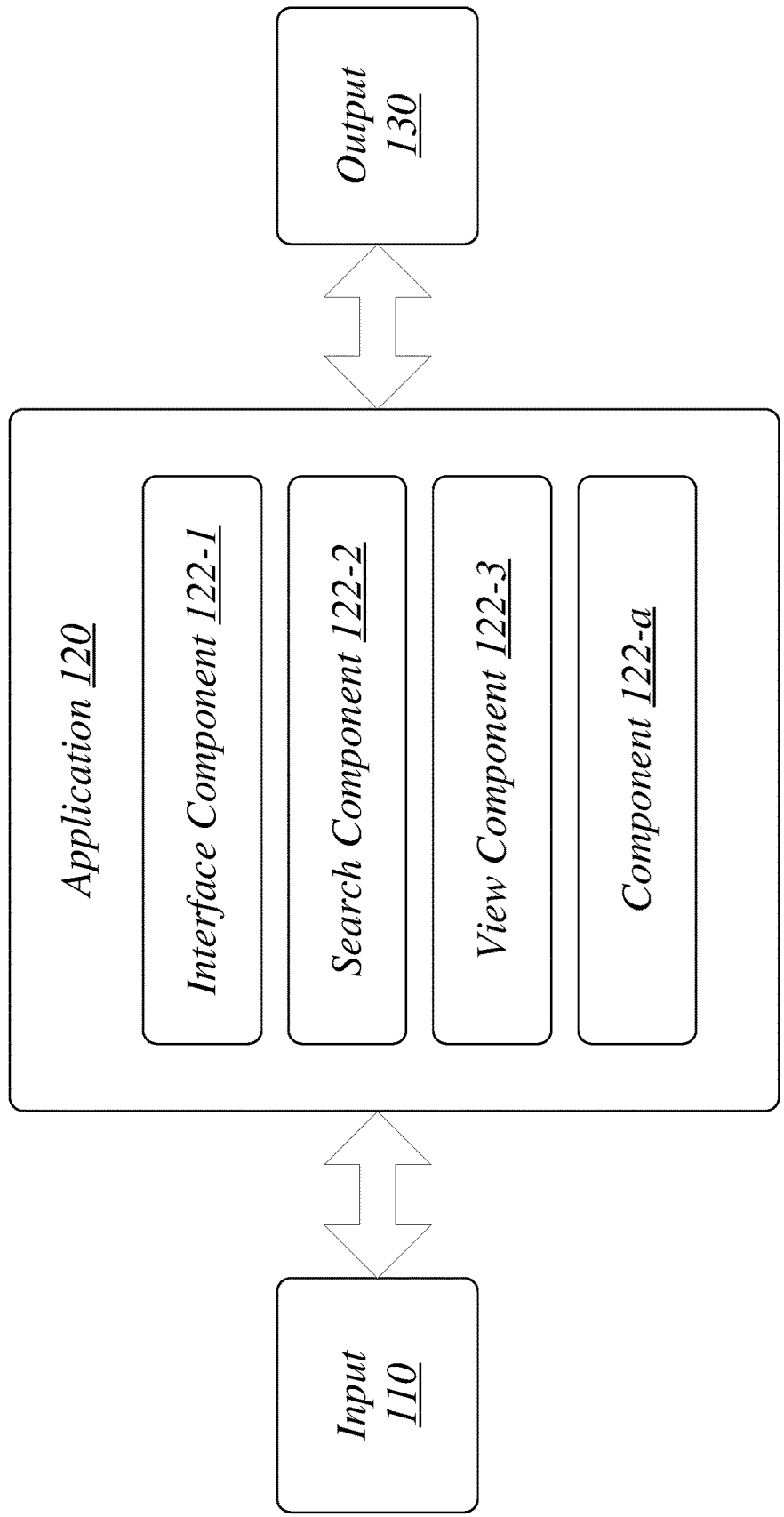
FIG. 1 illustrates an embodiment of a system to use machine learning for risk assessment.

Various embodiments are directed to techniques to use machine learning for risk assessment. As mentioned above, conventional risk management strategies fall short of a meaningful solution. Using these strategies, risk managers were forced to run reports from disparate data sources and to manually connect data using spreadsheets and special applications. By implementing a machine learning model, the embodiments of the present disclosure provide a risk learning engine with fewer or no time-consuming processes and with the capability of leveraging connections between data sources. The various embodiments described herein allow risk managers to use natural language searches to quickly see all risk information related to their search query's subject matter. The risk manager can interact with the risk learning engine, for example, by selecting records having relevant risk information, to train the machine learning model to accurately represent the risk manager's thought process. In response to that user selection, the machine learning model is modified to indicate the selected record's increased relevance. The risk manager may also select or otherwise identify records having irrelevant information. Similarly, the machine learning model is modified to indicate the selected record's decreased relevance or lack of relevance altogether. Through the refinement of searches, the machine learning model as described herein identifies patterns and relationships for risk management. For instance, if a process was being improved or a product was being introduced, the machine learning model may identify previous and potential failures for the new process/new product. As a result, the embodiments can improve affordability, scalability, modularity, extendibility, or interoperability for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

As mentioned above, the system 100 includes the application 120 as a type of software application running on an electronic device, such as a desktop application running on an operating system of a computing device, a mobile application running on a mobile operating system of a mobile device, or a web application running on a browser component of either the mobile operating system or the desktop operating system. Those skilled in the art would understand how to design, build, and deploy the software application on any type of electronic device.

The application 120 may be generally arranged to process input 110 of which some input may be provided directly to an interface component 122-1 via an input device, and other input may be provided to the interface component 122-1 via a network. For example, a user may enter data via a keyboard device attached to a computing device running the application 120. The application 120 may be generally arranged to generate output 130 for the interface component 122-1 of which some output may be configured for display on a display device and other output may be communicated across the network to other devices. As an example, the application 120 may generate data that can be processed/rendered by the interface component 122-1 into content for a Graphical User Interface (GUI).

The application 120 may be generally arranged to provide a device user or users with various services; among the provided services, the application 120 may provide the device user with risk management services. As described herein, risk management services utilize a plurality of disparate data sources to identify potential risks or opportunities. The application 120 may include a search component 122-2 (e.g., a search engine) to scour various data sources for items or records of interest. In response to a search query, the search component 122-2 responds with a set of search results as the output 130. The application 120 may accept, as the input 110, user selections with respect to the set of search results and those selections are used to build and train a machine learning model.

The application 120 may comprise a view component 122-3 to build a user interface (UI) view into the plurality of data sources used for risk management. The view generated by the view component 122-3 may refer to a graphical user interface (GUI) through which users can access, view, and arrange records from the data sources. Similar to the search component 122-2, user selections with respect to the records may be used to build and train the machine learning model to improve risk management.

Figure 2:
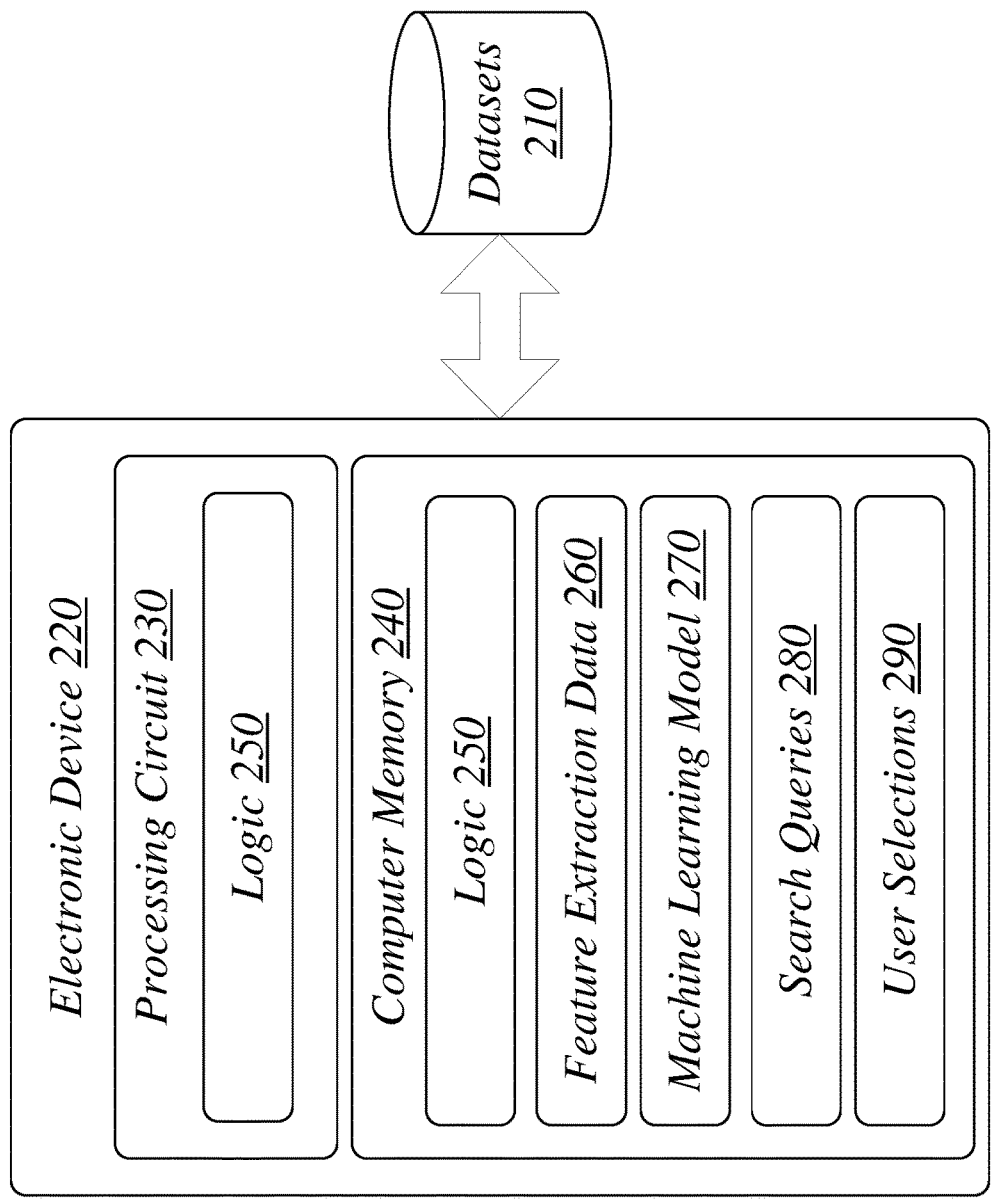
FIG. 2 illustrates an embodiment of an apparatus for the system of FIG. 1.

FIG. 2 illustrates an embodiment of an apparatus 200 for the system 100. As shown in FIG. 2, the apparatus 200 includes an electronic device 220 communicably coupled to a plurality of datasets 210 (or simply datasets 210). As described herein, the plurality of datasets 210 includes structured data (e.g., records) corresponding to various data sources.

The electronic device 220 (or simply device 220) includes a processing circuit 230 and computer memory 240 on which logic 250 is stored for execution by the processing circuit 230. When executed on the processing circuit 230, the logic 250 is operative to cause the processing circuit 230 to perform feature extraction on records across the plurality of datasets 210. A record, in general, is structured data whose content relates to certain subject matter. Each dataset of the plurality of datasets includes a collection of records whose content pertains to same or similar subject matter. Because the plurality of datasets 210 originate from different data sources, some records have different formats while pertaining to the same subject matter (e.g., same product or process). Furthermore, the above-mentioned feature extraction refers to a process for identifying features from the datasets 210 and generating feature extraction data 260. It is appreciated that those skilled in the art may accomplish the feature extraction process via a function (e.g., a kernel function or a filter). The features being extracted comprise at least one feature associated with risk indicia and at least one feature associated with a particular data source of at least one of the datasets 210. An example feature associated with a record's data source may indicate to what degree the record's data source is relevant to a risk assessment of the record's subject matter. Another example feature associated with a record's data source may indicate one or more other data sources that are relevant to a risk assessment of the record's subject matter. An example feature associated with a record's risk indicia may indicate to what degree the record's stored information is relevant to a risk assessment of the record's subject matter.

The logic 250 is operative to cause the processing circuit to build a machine learning model 270 based upon the feature extraction data 260 generated during the feature extraction on the records in the datasets 210. In some embodiments, the machine learning model 270 includes risk assessment data for the records across the plurality of datasets 210. For at least one record of the records in the datasets 210, the risk assessment data includes at least one risk assessment value in accordance with a metric. It is appreciated a number of known metrics in the field of risk management are applicable. In general, a risk assessment value indicates a level of risk associated with a subject matter of a particular record or group of records.

In some embodiments, a group of records pertaining to a (new) financial product are from disparate data sources, and each record's content includes at least some risk indicia. It is appreciated that a record's content may be classified as negative indicating at least some risk or positive indicating little or no risk involved in the new financial product. To illustrate by way of example, a commercial credit card may be a new financial product for which a risk assessment is desired. Records in the form of loss events, product notes, testing issues, and/or the like provide various content to the commercial credit card; other records may be deemed irrelevant for a variety of reasons. The content in these records may indicate a considerable or high level of risk, little or no risk, and any intermediate level of risk. Features corresponding to the risk indicia in a particular record and features corresponding to the data source providing the particular record may be analyzed, quantified, and then, used to measure the particular record's level of risk or risk assessment value.

The logic 250 is operative to further cause the processing circuit to identify a set of records from the records across the plurality of datasets 210. Each record of the identified set of records includes risk assessment data (e.g., the risk assessment value) that exceeds the baseline threshold. Depending on the machine learning model 270's implementation, the risk assessment value may imply a high or significant level of risk if the value exceeds a baseline threshold. It is appreciated that any suitable implementation of a machine learning model can used as the machine learning model 270. In some embodiments, the baseline threshold may be a pre-defined value established off-line arbitrarily or via some mathematical process. In other embodiments, the machine learning model 270 may establish the baseline threshold at a value occupying a position within twenty (20) percent of a highest possible risk assessment value or, as an alternative, greater than eighty (80) percent of the records in the datasets 210.

The logic 250 is operative to further cause the processing circuit to return at least one record of the set of records in response to search queries 280, which may be submitted into a search engine. The logic 250 may implement the search engine or, as an alternative, may operate the search engine as an independent module. In some embodiments, the search queries 280 include natural language search queries and/or keyword search queries for which the search engine identifies matching records. Most if not all matching records pertain to the same subject matter. As described herein, the user may select a record to signify that record as being more relevant or less relevant and that selection may cause an adjustment to the record's risk assessment data.

The logic 250 is operative to cause the processing circuit to modify the risk assessment data in the machine learning model 270 in response to user selections 290 corresponding to the at least one returned record. As described herein, the user selections 290 generally refers to various user interactivity data in which the user configures/organizes the returned records. In some embodiments, the user selections 290 form connections between records of different data sources or datasets. By way of the user selections 290, a degree of relevance may be attributed to the selected records. These connections cause either an increase or a decrease in a selected record's risk assessment value. One record's content, by itself, may have a certain risk assessment value; when another record pertaining to the same subject matter becomes connected and provides context for the first record's content, the logic 250 modifies the certain risk assessment value to account for the context. For example, the other record may include additional risk indicia implying that the first record's certain risk assessment value is a conservative estimate. The logic 250 increases the certain risk assessment value to account for the additional risk indicia.

As described in the present disclosure, the user selections 290 may be used to accurately capture a relationship between a record's content and a risk assessment of the record's subject matter. To illustrate by way of example, the record may be a loss event attributed to a product and therefore, valuable to the risk assessment of that product. By selecting that record, the user is informing the logic 250 of the record's importance. In turn, the logic 250 modifies the risk assessment data for the record but also adjusts the machine learning model. The logic 250 may adjust certain feature weights such that a record of similar or equal importance can be identified automatically in the future; otherwise, a conventional risk management solution would miss that record for failing to codify the record's importance. In contrast, the record may hold benign product information having little or no impact on the product's risk assessment. The logic 250 may adjust certain feature weights such that a similar record can be identified and then, discarded automatically in the future.

With respect to the search queries 280 and corresponding search results, the user selections 290 includes instances where the user, after viewing records in the search results, invokes a GUI element associated with a record in order to increase or decrease that record's relevance to the subject matter's risk assessment. In response, the logic 250 makes a determination as to whether the record's risk assessment data is to be modified. According to some embodiments, the logic 250 modifies the record's risk assessment data in proportion to a number of user selections of that record by a population of users. In at least one embodiment, the logic 250 adds, to the feature set in the feature extraction data 260, a feature related to user selections 290 such that the number of users selecting the record as relevant factors into the record's risk assessment value. Thus, the logic 250 increases the record's risk assessment value after a considerable number of selections to increase the record's relevance.

In some embodiments, the logic 250 (or different logic) enables different views into the plurality of datasets 210 where each view is an arrangement of different windows (e.g., controls). Each window displays one or more records and their content or at least a portion thereof. A control may be a window displaying one or more records that meet some criteria or otherwise filtered. By aggregating the views of the population of users, the logic 250 may identify patterns connecting records from disparate data sources. The logic 250 may adjust feature weights associated with the disparate data sources to accurately account for a data source's importance in risk assessment.

Figure 3:
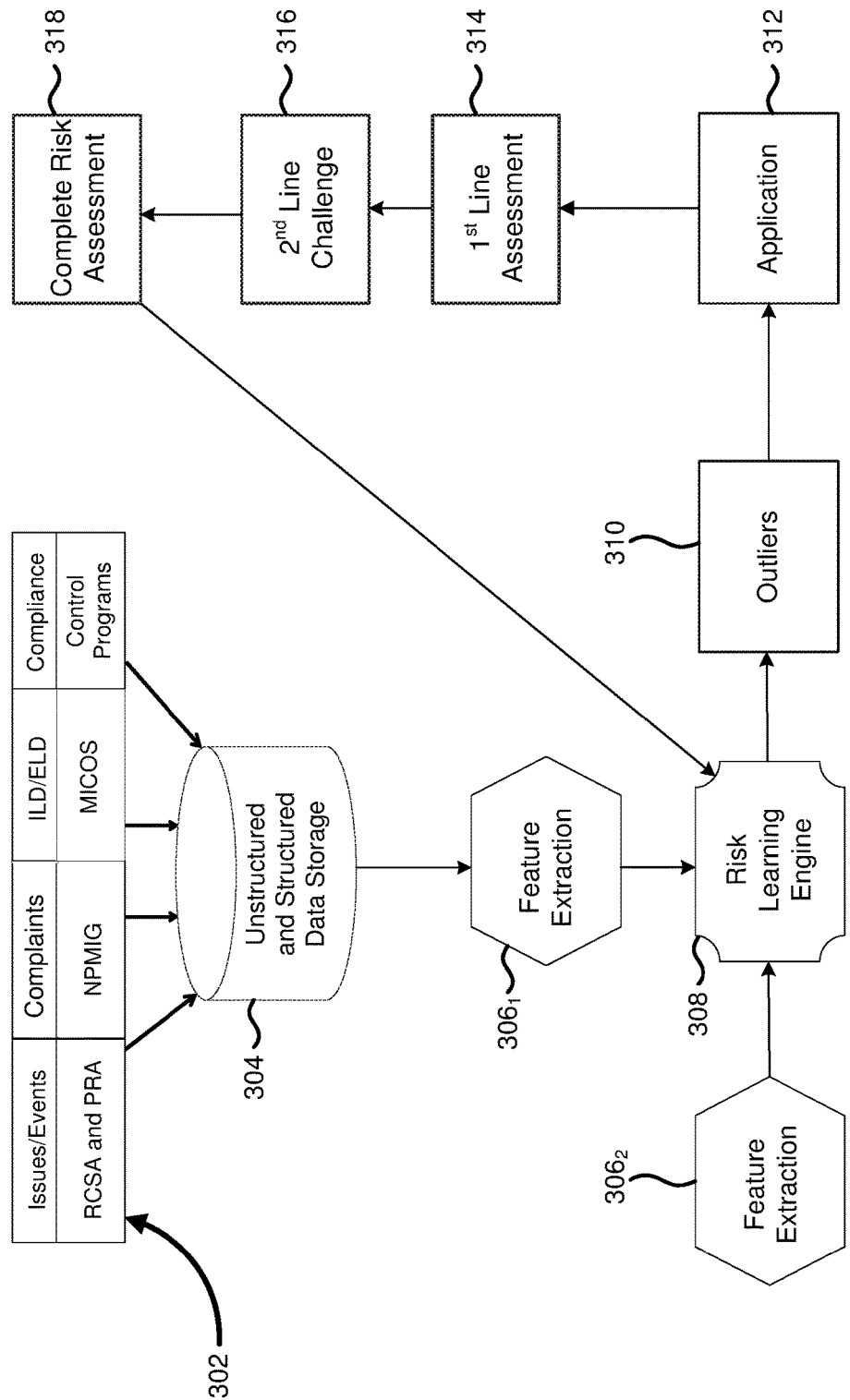
FIG. 3 illustrates an embodiment of a risk learning method for the system of FIG. 1.

FIG. 3 illustrates an embodiment of a risk learning method 300 for the system 100. As shown in FIG. 3, the risk learning method 300 commences with a plurality of data sources 302.

Datasets from the plurality of data sources 302 are feed into unstructured and structured data storage 304 (or simply data storage 304). Each dataset may be either unstructured or structured in a known or discoverable format. It is appreciated that some unstructured datasets may be configured in an unknown format while other datasets have no format and require structure. In some embodiments, the risk learning method 300 provides uniformity by generating records in a generic format for storing the datasets from the plurality of data sources 302.

As illustrated in FIG. 3, the data sources 302 refer to datasets covering issues/events; complaints; Internal Loss Data (ILD) which describe operational losses that occurred within an enterprise; External Loss Data (ELD) which describe operational losses by other financial institutions; Compliance; control programs, Monthly Industry Consent Order Summaries (MICOS) from our Legal team which provide legal opinions on industry related actions from our regulators; New Product and Marketing Initiative Governance (NPMIG) which is a process to identify risks; Product Risk Assessment (PRA) and Risk and Control Self-Assessment (RCSA) which are processes to identify and size risks.

During feature extraction 3061, the risk learning method 300 analyzes the data in the data storage 304 for various features and generates feature extraction data identifying at least one of those features amongst the datasets in the plurality of data sources 302. According to some embodiments of the present disclosure, the features include risk assessment features corresponding to various risk indicia possibly present in the datasets, data source features corresponding to a data source's relationship to risk assessment, and/or the like. The feature extraction data from these features corresponding to new and unknown risks in the present environment. Feature extraction 3062 operates to support the feature extraction 3061 with feature extraction data corresponding to actual realized risks affecting the present environment. When combined, both sets of the feature extraction data provide a risk assessment for various products in the present environment.

A risk learning engine 308 may include a machine learning model that is built from the features and the feature extraction data provided by the feature extraction 3061 and the feature extraction 3062. The risk learning engine 308 may assign weights/parameters to each feature and generate risk assessment data for each record to denote a risk level for that record's subject matter (e.g., goods or services, such as a new commercial product). The risk assessment data for each record may result from combining the feature weights and corresponding feature values into a single risk assessment value. The machine learning model may include a function (e.g., a polynomial function) where the feature weights are coefficients and the feature values are the input variables such that each record has a function value indicating a particular risk level given the features present in the record. In another implementation, the machine learning model may include a probability distribution (e.g., a statistical model) where each record has a conditional probability of having a particular risk level given the features present in the record.

Outliers 310 having risk assessment value above a threshold value are identified from the machine learning model by the risk learning engine 308 and fed into an application 312. It is appreciated that the risk assessment values associated with the outliers 310 may be heuristic values or probability values and therefore, the baseline threshold may be a heuristic value or a probability value. Each record of the outliers 310 provides content that is relevant to a risk assessment of the record's subject matter.

As described herein, the application 312 (e.g., the application 120 of FIG. 1) may be a web application or a mobile application that operates a user interface between application users and the outliers 310. The application 312 provides various mechanisms for accessing and analyzing the outliers 310 for insight, including a search engine and a view generator. User selections submitted through the application 312 for the outliers 310 may modify the risk assessment data in the machine learning model. In some embodiments, when the user selects a record as being relevant to the risk assessment of the record's subject matter, the risk learning engine 308 increases feature values, which, in turn, increases the risk assessment value. The risk learning engine 308 also may adjust feature weights to make the machine learning model's function better fit the actual distribution of risk assessment values.

In some embodiments, backend administrative processes are executed on the records in the data storage 304 including a first line assessment 314 and a second line assessment 316. The backend administrative processes examine the record's content and modify the record's risk assessment data accordingly, providing a complete risk assessment 318 to the risk learning engine 308. In each backend administrative process, each record's content undergoes validation to determine whether the machine learning model 270 accurately accounts for that record's impact on risk assessment. The complete risk assessment 318, in addition to describing each record's level of risk, may instruct the risk learning engine 308 to modify the machine learning model, for example, by adjusting feature values, feature weights, and/or the model's (kernel) function.

Figure 4:
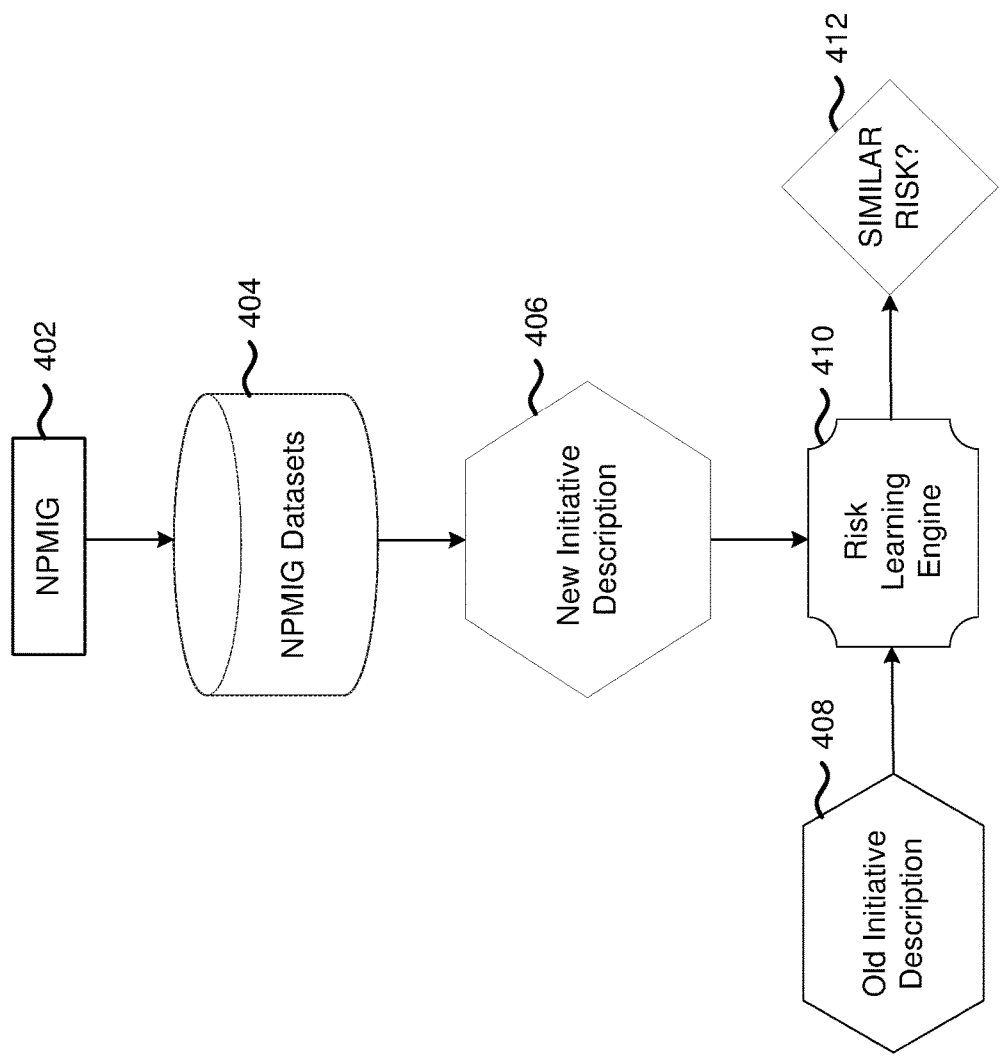
FIG. 4 illustrates an embodiment of another risk learning method for the system of FIG. 1.

FIG. 4 illustrates an embodiment of a risk learning method 400 for the system 100. As shown in FIG. 4, the risk learning method 400 applies to New Product and Marketing Initiative Governance (NPMIG) 402, which is a process to identify risks in new products (e.g., financial products). Starting with NPMIG datasets 404—a data storage device for storing NPMIG data—the risk learning method 400 generates performs feature extraction for a new initiative description 406. In some embodiments, the new initiative description 406 includes a set of records with content describing the new product and marketing initiative. In addition to identifying risk indicia in those datasets, the risk learning method 400, via a risk learning engine, executes the feature extraction to identify additional features for describing the new product and marketing initiative. Hence, the risk learning method 400 uses the features to identify new potential risks as well as to capture the content for the new initiative description 406.

A risk learning engine 408 builds a machine learning model to identify a subset of the above-mentioned set of records having a certain risk level. In some embodiments, the machine learning model includes a metric for computing a risk assessment value associated with the new initiative description 406 and corresponding feature extraction data. At some previous point, feature extraction was executed on old products to identify potential risks. A set of old initiative descriptions 408 provides information on previous risks associated with older product and marketing initiatives. Each old initiative description 408 is a set of records whose content is associated with a same product (i.e., subject matter). Features corresponding to the old initiative descriptions 408 indicate actual risks that can be compared with the above-mentioned potential risks to determine whether there is any validity to them.

For the machine learning model, the risk learning engine 410 applies a clustering technique to the set of old initiative descriptions 408. The clustering technique, in general, sorts the old initiative descriptions according to their risk assessment data and then, divide the sorted descriptions into partitions according percentile group. For instance, the descriptions occupying a top twenty-five (25) % are deemed to be describing significant risks and are to be compared with the new initiative description 406. After performing such a comparison, the risk learning engine 410, at decision block 412, determines whether there is a similar risk in the new initiative description 406.

Figure 5:
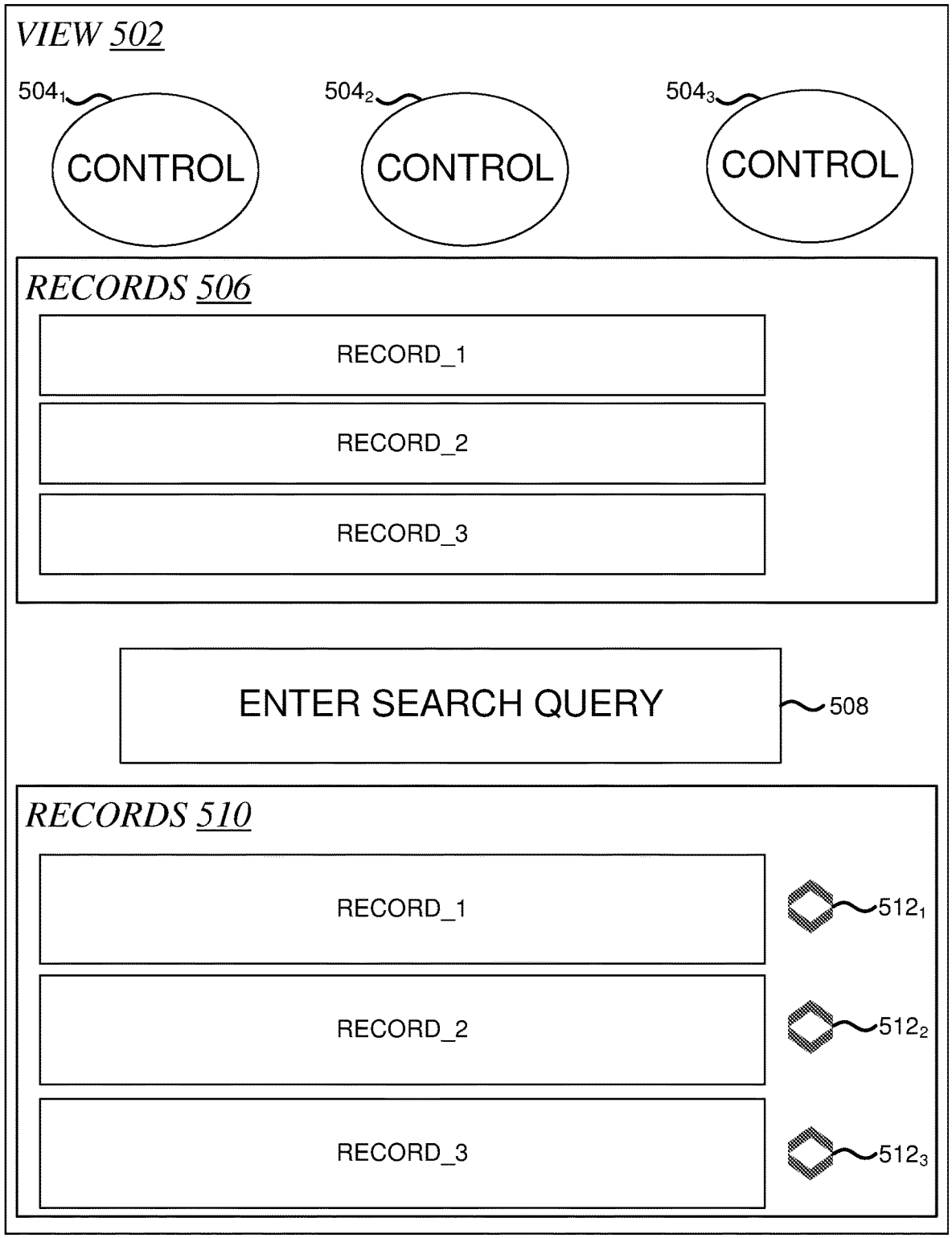
FIG. 5 illustrates an embodiment of a view for the application of FIG. 1.

FIG. 5 illustrates an embodiment of a user interface 500 for the system 100. As shown in FIG. 5, the user interface 500 includes a view 502, an arrangement of user interface (UI) components, for an application.

Among the UI components, graphical user interface (GUI) elements known as controls 504 determine which records 506 to display. For example, a control $504_1$ may direct the view 502 to the records 506 from certain data sources, excluding other data sources, such as when the user specifically selects these data sources in a menu. As another example, a control $504_2$ may direct the view 502 to sort and then, display the records 506 from the certain data sources according to some attribute and that attribute's metric. In yet another example, a control $504_3$ may direct the view 502 to filter and then, display the records 506 from the certain data sources according to another attribute and a particular attribute value.

It is appreciated that the user selections as described herein may refer to the user's configuration of these controls 504. To illustrate with respect to the control $504_1$, when the user selects the certain data sources from the menu, those selections imply a relationship between the certain data sources such that the certain data sources are prioritized for risk management. For instance, records from one data source describing certain subject matter may provide context for records in another data source when those records describe similar or same subject matter; together, both sets of records improve upon an accuracy to each other's risk assessment and further enhance an overall risk assessment of the certain subject matter. Therefore, by connecting these sets of records, the system 100 may improve upon risk assessment data associated with these records. In some embodiments, by aggregating views from a number of users, the system 100 may learn a pattern of data sources that could be connected when executing feature extraction, improving upon the overall risk assessment.

It is further appreciated that additional user interactivity may modify the risk assessment data amongst the records 506. With respect to the control $504_2$ and/or the control $504_3$, the system 100 may capture a pattern amongst the sorted records and/or the filtered records in the records 506 display area. These patterns may provide insight into modifying the risk assessment data of at least one of these records, such as by increasing or decreasing a risk assessment value. In some embodiments, the user may select (e.g., highlight) a record in the records 506 display area for a risk assessment adjustment. These patterns also may provide insight into which terms to use when modifying content of at least one of these records and/or modifying search queries to return the sorted records and/or the filtered records in the records 506 display area.

As further depicted in FIG. 5, the view 502 includes a search engine including a search portal 508 for entering search queries and a display area for records 510 as the search queries' search results. User selections directed towards records in the records 510 display area may cause the system 100 to modify risk assessment data in these records. Because the records in the records 510 display area match the search query, these records have content pertaining to shared subject matter. In some embodiments, the user may activate a cursor, a GUI element, to increase or decrease a particular record's relevance to the risk assessment of their subject matter. FIG. 5 depicts example cursors as a cursor 5121, a cursor 5122, and a cursor 5123. A user selection of any of these example cursors may cause the system 100 to modify the risk assessment data in a corresponding record of the records 510.

Figure 6:
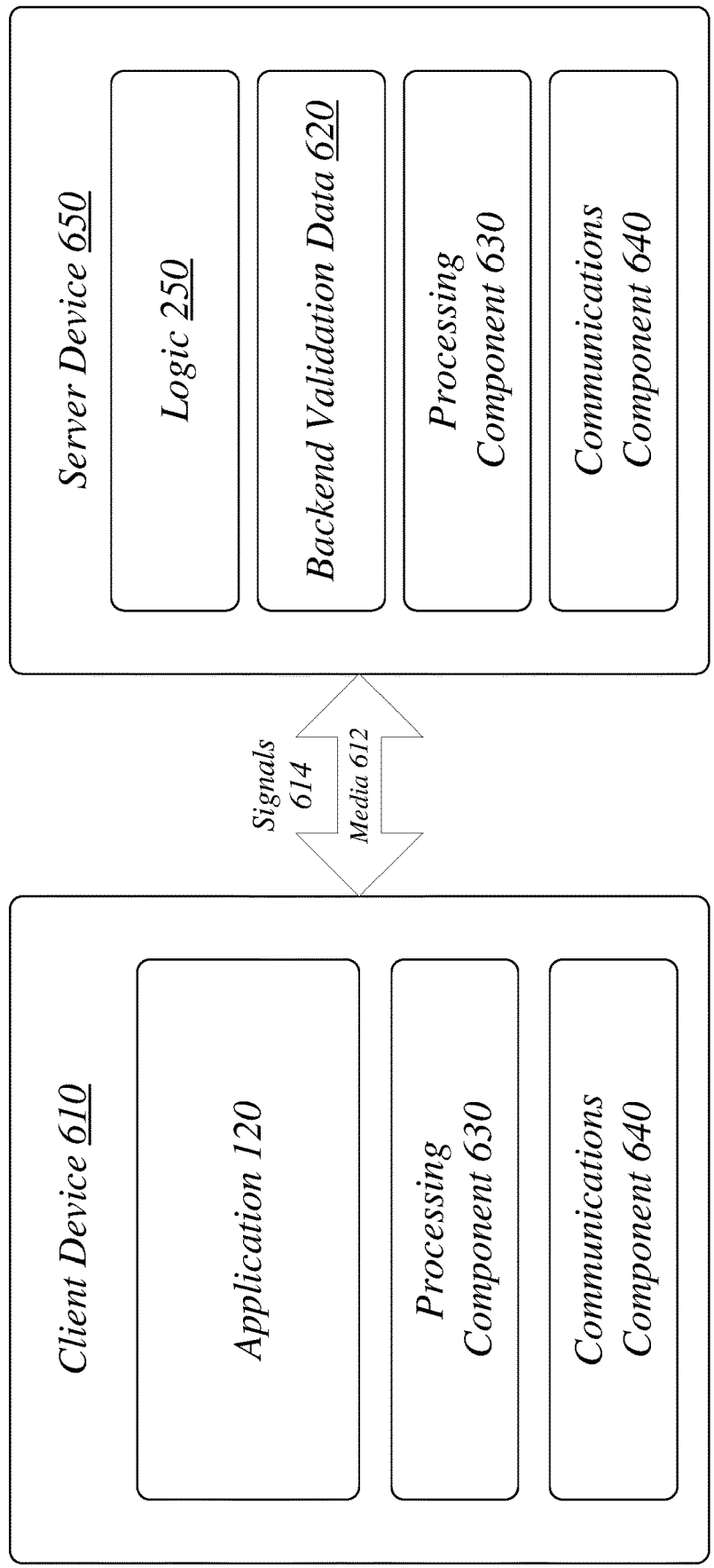
FIG. 6 illustrates an embodiment of a distributed system for the system of FIG. 1.

FIG. 6 illustrates a block diagram of a distributed system 600. The distributed system 600 may distribute portions of the structure and/or operations for the system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 650. In general, the client device 610 and the server device 650 may be an electronic device and the same or similar to the apparatus 200 as described with reference to FIG. 2. The client system 610 and the server system 650 may each comprise a processing component 630 and a communications component 640. The devices 610, 650 may communicate over a communications media 612 using communications signals 614 via the communications components 640.

Each of the devices 610, 650 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Each of the devices 610, 650 may execute processing operations or logic for the system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Each of the devices 610, 650 may execute communications operations or logic for the system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 610 may comprise or employ one or more client programs that operate to perform various methodologies in accordance with the described embodiments. In one embodiment, for example, the client device 610 may implement the application 120 of FIG. 1.

The server device 650 may comprise or employ one or more server programs that operate to perform various methodologies in accordance with the described embodiments. In one embodiment, for example, the server device 650 may implement the logic 250 of FIG. 2. The server device 650 may include backend validation data 620 that is generated during backend validation processes (e.g., a first line assessment and a second line assessment). Risk managers (off-line) may review various records among the plurality of datasets and adjust risk assessment values accordingly. These risk managers may verify potential risks as actual risks or false alarms. The logic 250 may use the backend validation data 620 to modify the risk assessment value of at least one record as well as the machine learning model to perform risk assessment.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 performs feature extraction on records across a plurality of datasets at block 702. For example, the logic flow 700 may analyze content stored in the records for features and upon identifying at least one feature, may generate feature data (e.g., feature values) for each record. The feature data may be generated during feature extraction and therefore, may be referred to herein as feature extraction data. Some of the feature data corresponds to risk assessment data for the records.

The logic flow 700 may build a machine learning model to include the risk assessment data at block 704. For example, the logic flow 700 may build the machine learning model to execute a weighted risk assessment analysis of a record's feature data. The machine learning model may specify a set of feature weights and a heuristic function for computing a risk assessment value denoting a level of risk for the record content's subject matter.

The logic flow 700 may identify a set of records that exceed a baseline threshold at block 706. For example, the logic flow 700 may compare each record's risk assessment value to the baseline threshold to determine whether that record includes information relevant to the risk assessment of the record's subject matter. If the record exceeds the baseline threshold by a significant margin, the logic flow 700 identifies the record as indicating a credible risk for the record's subject matter.

The logic flow 700 may return at least one record in response to a search query at block 708. Because the identified set of records are relevant to the risk assessment, at least one of these records would be relevant search result to a search query in furtherance of that risk assessment. For example, if the user enters a search query with a product name, the at least one returned record includes content indicating a level of risk associated with the product or a similar product.

The logic flow 700 may modify the risk assessment data in the machine learning model at block 710. For example, the logic flow 700 may respond to user selections with respect to a particular returned record by increasing or decreasing a risk assessment value of the particular returned record. As described herein, the user may select the particular returned record as being more relevant than the current risk assessment value represents. In turn, the logic flow 700 increases the risk assessment value such that the returned record appears at a higher position in search results for future search queries. The embodiments are not limited to this example.

Figure 8:
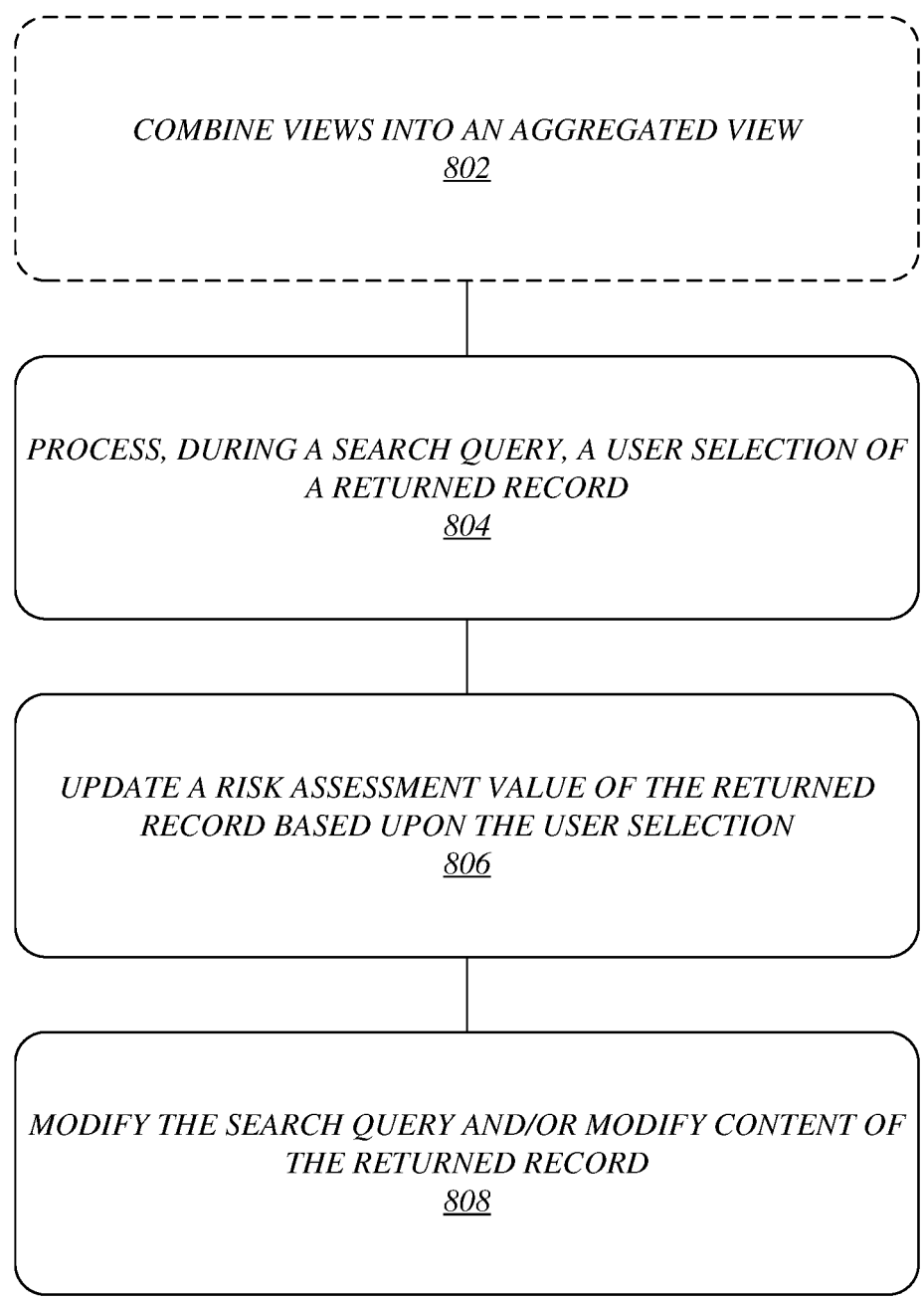
FIG. 8 illustrates an embodiment of another logic flow for the system of FIG. 1.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may combine views into an aggregated view at optional block 802. For example, if a number of users are share a pattern of data sources, that pattern can be used to connect datasets in these data sources. If, for example, these users are researching a new product, the pattern of data sources are further relevant towards the risk assessment of the new product.

The logic flow 800 may process, during a search query, a user selection of a returned record at block 804. The user selection indicates a degree of relevance upon the returned record. For example, the user selection may invoke a GUI element causing an increase (or a decrease) in a risk assessment value of the returned record. In some embodiments, the user selection is risk indicia strongly implying that the returned record has important content towards understanding how risky the new product may be to introduce.

The logic flow 800 may update a risk assessment value of the returned record based upon the user selection at block 806. As described herein, a machine learning model having features corresponding to risk assessment may be used by the logic flow 800 to compute the risk assessment search value of the returned record. For example, the logic flow 800 may adjust feature values for the returned record, which in turn increases or decreases the risk assessment value. As another example, the logic flow 800 may adjust features weights to more accurately correlate the returned record's feature values with the increased risk assessment value. The feature weights may be coefficients in a function; instead of adjusting the weights, the logic flow 800 may adjust the function in a different example.

The logic flow 800 may modify the search query and/or modify content of the returned record at block 808. For example, the logic flow 800 may add one or more search terms to or remove on or more search terms from the search query. The logic flow 800 may automatically replace the search query with the modified search query. In addition or as an alternative, the logic flow 800 may add content to or remove content from the returned record. By doing so, the logic flow 800 can provide search results with higher risk assessment values. The embodiments are not limited to this example.

Figure 9:
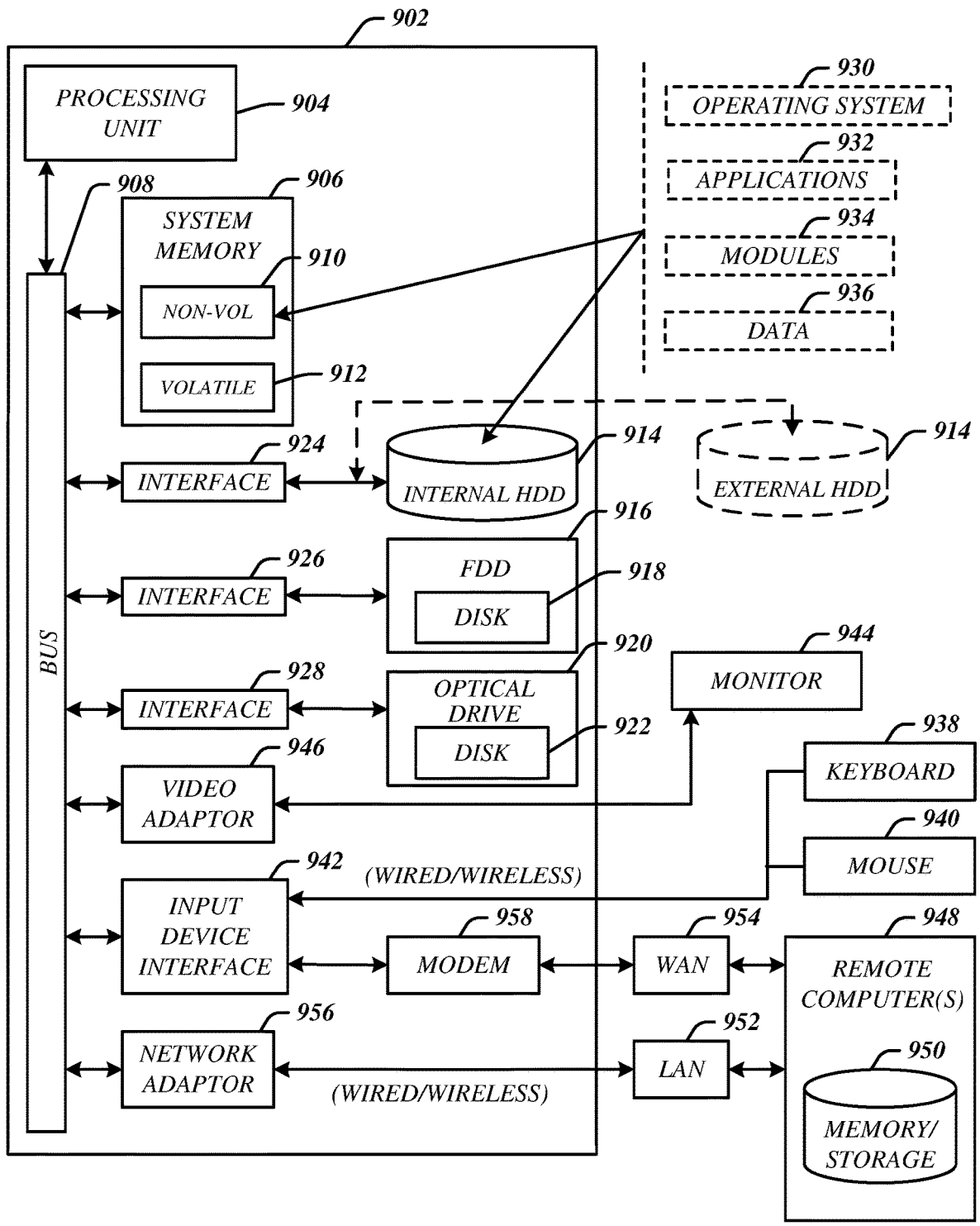
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
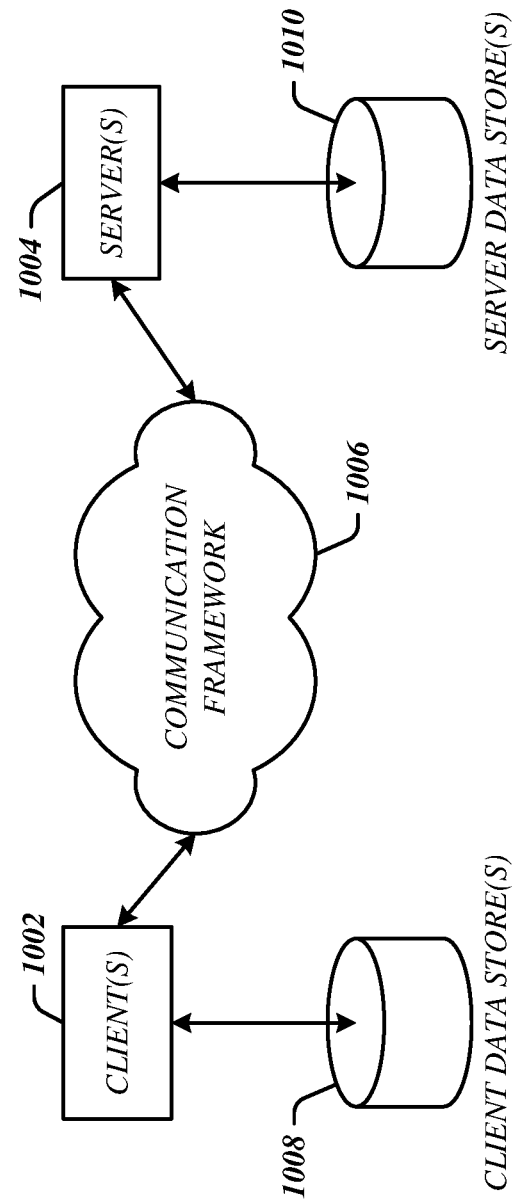
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 610. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processing circuit; and
logic stored in computer memory and executed on the processing circuit, the logic operative to cause the processing circuit to:
perform feature extraction on records across a plurality of datasets, features corresponding to the feature extraction comprise at least one feature associated with risk indicia and at least one feature associated with a particular data source of at least one of the plurality of datasets;
build a machine learning model based upon data generated during the feature extraction on the records, the machine learning model comprising risk assessment data for the records across the plurality of datasets;
identify a set of records from the records across the plurality of datasets, each record of the set of records having risk assessment data that exceeds a baseline threshold;

return at least one record of the set of records in response to search queries; and modify the risk assessment data in the machine learning model in response to user selections corresponding to the at least one returned record.

2. The apparatus of claim 1 further comprising logic operative to modify content of the at least one returned record in response to user selections corresponding to the at least one returned record.

3. The apparatus of claim 1 further comprising logic operative to process, during a search query, a user selection of the at least one returned record.

4. The apparatus of claim 3 further comprising logic operative to update a risk assessment value of the at least one returned record.

5. The apparatus of claim 4 further comprising logic operative to modify a search query and instruct a search engine to perform a search on the modified search query.

6. The apparatus of claim 5 further comprising logic operative to perform at least one of adding or removing search terms to the search query to generate the modified search query.

7. The apparatus of claim 6 further comprising logic operative to automatically replace the search query with the modified search query.

8. The apparatus of claim 1 further comprising logic operative to process backend validation data to update the risk assessment data of the machine learning model.

9. The apparatus of claim 1 further comprising logic operative to identify groups of relevant datasets based upon the risk assessment data in the machine learning model.

10. A computer-implemented method executed on a processing circuit, comprising:

generating feature extraction data from records across a plurality of datasets, features corresponding to the feature extraction data comprise at least one feature associated with risk indicia and at least one feature associated with a particular data source of at least one of the plurality of datasets;

building a machine learning model based upon the feature extraction data on the records, the machine learning model comprising risk assessment data for the records across the plurality of datasets;

identifying a set of records from the records across the plurality of datasets, each record of the set of records having risk assessment data that exceeds a baseline threshold;

returning at least one record of the set of records in response to search queries; and modifying the risk assessment data in the machine learning model in response to user selections corresponding to the at least one returned record.

11. The computer-implemented method of claim 10 further comprising processing, within search results, a user selection of a record of the set of records wherein the user selection indicates a degree of relevance upon the record.

12. The computer-implemented method of claim 11 further comprising updating a risk assessment value of the record.

13. The computer-implemented method of claim 12 further comprising modifying the search query and instructing a search engine to perform a search on the modified search query.

14. The computer-implemented method of claim 13 further comprising performing at least one of adding or removing search terms to the search query to generate the modified search query.

15. The computer-implemented method of claim 14 further comprising prioritizing the plurality of datasets based upon the updated risk assessment value of the record.

16. The computer-implemented method of claim 10 further comprising incorporating the machine learning model into a search engine.

17. The computer-implemented method of claim 10 further comprising modifying content of the at least one returned record in response to user selections corresponding to the at least one returned record.

18. At least one non-transitory computer-readable storage medium comprising instructions that, when executed, cause a system to:

generate feature extraction data from records across a plurality of datasets, features corresponding to the feature extraction data comprise at least one feature associated with risk indicia and at least one feature associated with a particular data source of at least one of the plurality of datasets;

build a machine learning model based upon the feature extraction data on the records, the machine learning model comprising risk assessment data for the records across the plurality of datasets;

execute a clustering process on the records across the plurality of datasets to identify a set of records, each record of the set of records having risk assessment data that exceeds a baseline threshold;

return at least one record of the set of records in response to search queries;

modify the risk assessment data in the machine learning model in response to user selections corresponding to the at least one returned record; and execute the clustering process on the records across the plurality of datasets to identify a new set of records.

19. The non-transitory computer-readable storage medium of claim 18, comprising instructions that when executed cause the system to: identify relevant search terms for the search queries using the machine learning model.

20. The non-transitory computer-readable storage medium of claim 18, comprising instructions that when executed cause the system to: prioritize the plurality of datasets based upon the modified risk assessment data.

* * * * *